Patented Nov. 5, 1929

1,734,693

REISSUED

UNITED STATES PATENT OFFICE

KURT RIPPER, OF VIENNA, AUSTRIA, ASSIGNOR TO FRITZ POLLOK, OF VIENNA, AUSTRIA

PROCESS FOR THE MANUFACTURE OF FILM-FORMING SOLUTIONS

No Drawing. Original application filed March 20, 1924, Serial No. 700,736, and in Austria March 31, 1923. Divided and this application filed June 22, 1925. Serial No. 38,920.

This invention relates to the manufacture of lacquers, films and the like by condensing urea or its derivatives with formaldehyde.

The present application is a division of my copending application Serial No. 700,736, filed March 20, 1924, Patent No. 1,687,312, dated Oct. 8, 1928, for a process for manufacturing condensation products. This copending application relates to the manufacture of condensation products clear as water from urea or its derivatives and formaldehyde, the process described therein comprises conducting the first stage of the reaction between a urea and formaldehyde, wherein the viscous initial products are formed in two essential phases, the first in the absence of free hydrogen ions and the second in the presence of free hydrogen ions, by adjusting the $C_H$ in the first phase, which is completed after applying heat for a short period of time, to a value of about $10^{-7}$ or below and in the second phase to a value upwards of $10^{-7}$ but not reaching $10^{-3}$, whereat the reaction is continued by further heating. The symbol $C_H$ represents usually grammes of hydrogen ions per liter. The hydrogen ion concentration may also be expressed by the symbol $p_H$ (chosen by Sörensen) representing $-\log H$. Therefore the value $C_H=10^{-7}$ corresponds to the value $p_H=7$, the value $C_H=10^{-3}$ to the value $p_H=3$. This mode of conducting the polymerization process in an acid medium results in the formation of a hydrophobe emulsion colloid which had been unknown heretofore. If the condensation product formed by short heating of the mixture of urea and formaldehyde is heated for prolonged time or if the concentration of the hydrogen ions is increased above a certain limit, this hydrophobe emulsion colloid is precipitated by cooling the reaction mass after accomplishment of the polymerization process.

The hydrophobe gel produced in the above described manner is superior to any other reaction product for manufacturing lacquers or films. It was for the first time that one succeeded in obtaining lacquers from condensation products of urea and formaldehyde made with non-aqueous solvents and non-aqueous tempering agents and even with such not mixable with water, by starting from the said hydrophobe product. This result is of importance, because there are no tempering agents for lacquers soluble in water, and because lacquers made without such additions have the disadvantage of easily cracking in the warmth.

Example 30 parts by weight of pure and neutrally reacting urea are mixed with 100 parts by weight of a 30% aqueous solution of formaldehyde which is free from acid or is neutralized or is slightly alkaline, the mixture being heated to boiling in a boiler with a reflux condenser. After short boiling 5 parts by weight of boric acid, dissolved in a little water, are added thereto; the whole mixture is thereafter further boiled in the boiler with the reflux condenser for 6 or 7 hours. After being allowed to stand in the cold for several hours, the mass is found to be divided in two layers, of which the upper one is poured off, whereafter the tough gel forming the lower layer is repeatedly washed with water. The gel thus produced can be dissolved in non-aqueous solvents, such as for instance epichlorhydrin. Mixed with softening agents this lacquer solution yields a non-cracking coating of lacquer, which is completely insensitive to any action of water.

What I claim is:

1. The process of producing film-forming solutions which consists in reacting on a urea with a solution of formaldehyde by boiling the mixture adjusted to a $C_H$ not exceeding $10^{-7}$ for a short time, thereafter adjusting the hydrogen ion concentration of the reaction mixture to a value upwards of a $C_H$ of $10^{-7}$ to cause complete conversion of the first formed hydrophile emulsion colloid in a hydrophobe colloid on further heating, continuing the reaction by heating the reaction mixture, cooling the reaction product whereby the hydrophobe colloid is precipitated therefrom, separating the precipitated colloid from the water and dissolving it in a non-aqueous solvent.

2. The process of producing film-forming solutions which consists in reacting on a urea with a solution of formaldehyde free of acid, initiating the reaction by boiling the mixture for a short time, thereafter adjusting the hydrogen ion concentration of the reaction mixture to a value upwards of a $C_H$ of $10^{-7}$ by addition of acid-reacting agents to cause complete conversion of the first formed hydrophile emulsion colloid in a hydrophobe colloid on further heating, continuing the reaction by heating the reaction mixture, cooling the reaction product whereby the hydrophobe colloid is precipitated, separating the precipitated colloid from the water and dissolving it in a nonaqueous solvent.

3. The process of producing film-forming solutions which consists in reacting on a urea with a solution of formaldehyde, the free formic acid content of which solution had been eliminated before starting the reaction, initiating the reaction by boiling the mixture for a short time, adjusting the hydrogen ion concentration in the reaction mixture by addition of acid-reacting agents to a value upwards of a $C_H$ of $10^{-7}$ to cause complete conversion of the first formed hydrophile emulsion colloid in a hydrophobe colloid on further heating, continuing the recation by heating the reaction mixture, cooling the reaction product whereby the hydrophobe colloid is precipitated therefrom, separating the precipitated colloid from the water, and dissolving it in a nonaqueous solvent.

4. The process of producing film-forming solutions which consists in reacting on a ura with a solution of formaldehyde, the free formic acid content of which solution had been neutralized before starting the reaction, initiating the reaction by boiling the mixture for a short time, adjusting the hydrogen ion concentration of the reaction mixture to a value upwards of a $C_H$ of $10^{-7}$ to cause complete conversion of the first formed hydrophile emulsion colloid in a hydrophobe colloid on further heating, continuing the reaction by heating the reaction mixture, cooling the reaction product whereby the hydrophobe colloid is precipitated therefrom, separating the precipitated colloid from the water, dissolving it in a nonaqueous solvent and adding a tempering agent.

5. The process of producing film-forming solutions which consists in reacting on a urea with a solution of formaldehyde, the free formic acid content of which solution had been neuaralized before starting the reaction, initiating the reaction by boiling the mixture for a short time, adjusting the hydrogen ion concentration in the reaction mixture to a value upwards of a $C_H$ of $10^{-7}$ to cause complete conversion of the first formed hydrophile emulsion colloid in a hydrophobe colloid on further heating, continuing the reaction by further heating the reaction mixture, cooling the reaction product whereat the hydrophobe colloid is precipitated therefrom, separating the precipitated colloid from the water, dissolving it in nonaqueous solvents and adding tempering agents, having the property of preventing the films formed by evaporation of the solutions from cracking.

In testimony whereof I have affixed my signature.

KURT RIPPER.